United States Patent [19]
Rohr

[11] 4,453,776
[45] Jun. 12, 1984

[54] CAST VEHICLE WHEEL RIM FOR TUBELESS TIRES

[75] Inventor: Jakob Rohr, Schaffhausen, Switzerland

[73] Assignee: George Fischer Ltd., Switzerland

[21] Appl. No.: 302,431

[22] PCT Filed: Jan. 21, 1981

[86] PCT No.: PCT/CH81/00006
§ 371 Date: Sep. 11, 1981
§ 102(e) Date: Sep. 11, 1981

[87] PCT Pub. No.: WO81/02140
PCT Pub. Date: Aug. 6, 1981

[30] Foreign Application Priority Data
Jan. 22, 1980 [CH] Switzerland ............... 493/80

[51] Int. Cl.³ ............... B60B 21/00; B60C 29/00
[52] U.S. Cl. ............... 301/5 VH; 301/11 R; 301/65; 301/97; 152/381.3; 152/427
[58] Field of Search ............... 301/5 VH, 6 CS, 11 R, 301/12 R, 13 R, 13 SM, 63 R, 65, 63 PW, 63 D, 95–98; 29/159.1, 159.01; 164/DIG. 14; 249/56; 152/427–428, 431, DIG. 11, DIG. 13, 378 R, 381.3–381.6

[56] References Cited

U.S. PATENT DOCUMENTS

| | | | |
|---|---|---|---|
| 2,548,928 | 4/1951 | Ash | 301/13 R |
| 2,798,529 | 7/1957 | Herzegh | 152/410 X |
| 2,840,133 | 6/1958 | Billingsley | 152/381.5 X |
| 3,275,378 | 9/1966 | Malthaner | 301/12 R |
| 3,376,076 | 4/1968 | Durrenmatt | 301/13 SM |
| 3,847,442 | 11/1974 | Masser | 301/13 SM |
| 4,165,131 | 8/1979 | Thompson | 301/65 |

FOREIGN PATENT DOCUMENTS

| | | | |
|---|---|---|---|
| 580861 | 8/1958 | Italy | 152/378 R |
| 424507 | 5/1967 | Switzerland | 301/13 R |

*Primary Examiner*—Charles A. Marmor
*Attorney, Agent, or Firm*—Roylance, Abrams, Berdo & Goodman

[57] ABSTRACT

A one-piece, cast vehicle wheel rim for tubeless tires comprises a rim portion and a supporting ring extending from the rim portion. The rim portion has a drop center portion between first and second side walls. The support ring mounts the rim on a disc and has a recess between its end areas. A valve hole is formed in the first side wall of the rim portion adjacent the recess for mounting a valve such that the valve extends into the recess. Radially extending ribs can connect a shoulder of the rim portion to the end areas of the support ring on opposite sides of the valve hole. The ribs can be angularly oriented toward each other in a radially outward direction and can be spaced from the valve hole by a distance between about 15 mm and about 30 mm. When used in combination with another rim to form dual wheels, a coupling on the support ring attaches the rims. The coupling and recess permit the valve to be exposed for ready access.

8 Claims, 3 Drawing Figures

CAST VEHICLE WHEEL RIM FOR TUBELESS TIRES

The invention relates to a one-piece, cast vehicle rim, particularly designed for use with tubeless tires, having a rim portion with a drop-center portion, and a support ring for mounting the rim on a disc.

The known cast drop-center rims are disadvantageous, in that the valve holes are placed in the bottom wall of the drop center rim so that the valves are located between the drop-center portion of the rim and the brake drum. During long braking periods, the air temperature in the narrow annular slot between the rim and brake drum can reach several hundred degrees centigrade. As a consequence, the O-ring on the side adjacent to the brake drum can be heated to a temperature endangering the tightness of and the seal for the valve.

A further disadvantage relates to the removal of the rim, e.g. when a tire is replaced. In this case, the rim is often jammed onto the disc so that the rim caan only be removed after extensive efforts, sometimes causing damage to the rim and the disc.

BRIEF DESCRIPTION OF THE INVENTION

An object of the present invention is to provide a one-piece, cast vehicle rim which does not have the disadvantages mentioned above with regard to security and to replacement of tires.

Another object of the present invention is to provide a one-piece, cast vehicle rim having a valve hole for mounting a valve such that the valve is not subjected to high temperatures, does not interfere with replacement of the tires and is readily accessible.

A further object of the present invention is to provide a one-piece cast vehicle rim which can be produced at low cost.

Other objects, advantages and salient features of the present invention will become apparent from the following detailed description of a preferred embodiment of the present invention.

Briefly described, the present invention relates to a one-piece, cast vehicle wheel rim, particularly for tubeless tires comprising a rim portion and a support ring extending from the rim portion. The rim portion has a drop center portion between first and second side walls. The support ring mounts the rim on a disc and has a recess between its end areas. A valve hole is formed in the first side wall of the rim portion adjacent the recess for mounting a valve such that the valve extends into the recess.

The rim portion can include a shoulder extending from the first side wall in a direction opposite to the drop center portion. Radially extending ribs can connect the shoulder to the end areas of the support ring on opposite sides of the valve hole. The ribs can be angularly oriented toward each other in a radially outward direction and can be spaced from the valve hole by a distance between about 15 mm and about 30 mm.

When used in combination with another rim to form dual wheels, a coupling can be provided on the support ring for attaching the rim to the other rim. The coupling and recess permit the valve to be exposed for ready access.

The valve mounting arrangement of the present invention permits simpler valves to be used than those used in conventional vehicle rims so that valve costs can be reduced by as much as 50 percent. Also, the valve does not extend through the annual slot between the rim drop-center portion and the brake drum so that its O-ring is located out of the area subjected to extremely high temperatures, thereby improving the security and integrity of the seal.

In addition, the elasticity of the edge of the support ring is being improved. Thus, the rim, even after long use, can be easily removed from and remounted onto the disc.

BRIEF DESCRIPTION OF THE DRAWINGS

Referring to the drawings which form a part of this Specification, and wherein.

DETAILED DESCRIPTION OF PREFERRED EMBODIMENT

Figure 1:
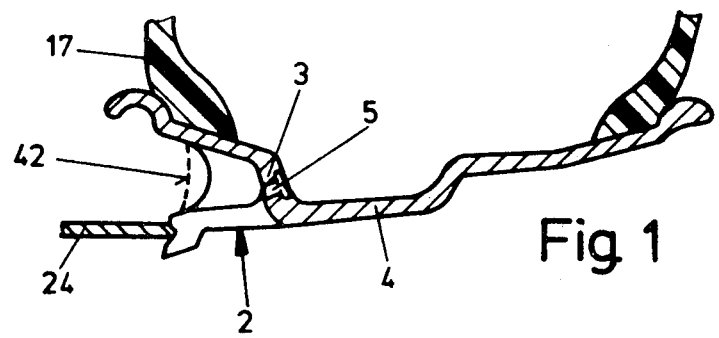
FIG. 1 is a partial, side elevational view of a one-piece, cast vehicle wheel rim according to the present invention, in section taken along line I—I of FIG. 3.

Referring to the drawings, the one-piece, cast vehicle wheel rim of the present invention has a support ring 2 cast as a unitary part thereof for mounting the rim on a disc, e.g., a wheel spider, by clamps. The outer side wall 3 of the drop-center portion of the rim portion has a valve hole 5 in which a valve 10 is mounted from the tire side of the rim. An O-ring is placed between the valve head 12 and the tire side of the side wall 3. A sleeve nut 16 on the other side of the rim is pressed against the side wall 3 to affix the valve and compress the O-ring so that no air can escape from the tire.

If necessary, a tube can be placed within the tire. In that case, the valve is placed in the tube.

The valve 10 extends into a recess 18 in the support ring 2 so that the air inlet 19 of the valve 10 lies within the space defined by recess 18 and is spaced axially inside of the ring-shaped or annular recess 23. This arrangement is required for dual or twin wheels or tires with a spacing ring 24 mounted in the recess 23 so that the spacing ring 24 does not prevent access to the valve 10.

The end areas 25, 26 of the interrupted support ring 2 define the opposite sides of the recess 18. The outer side of the shoulder 30 of the rim portion is connected to the support ring 2 by the side wall 3. Ribs 31 and 32 are parts of wall 3 and connect the end areas 25, 26 directly to the shoulder. The ribs 31, 32 extend radially from the end areas and angularly toward each other in a radially outward direction, defining an included angle 35 of about 40° to about 80°, preferably 60°. This orientation of these ribs provides a certain radial flexibility for the end areas 25, 26 with sufficient stability or design strength for the support ring. The direction of the ribs is also advantageous in connection with the transformation of the flux of force.

Designs with two or more parallel ribs in each end area are possible. However, one rib for each end area has proved to be sufficient, as long as the width 36 of the rib approximately corresponds or is approximately equal to the thickness of the rim shoulder 30.

The valve hole 5 or the valve 10 is placed in the middle of the two ribs 31, 32. The distance 37 between the center of the hole 5 to each rib measures from about 15 mm to about 30 mm, and is preferably 20 mm, so that the nut 16 can be turned by hand. The distance between the end areas is dimensioned to ensure the stability and rigidity of the support ring.

Figure 2:
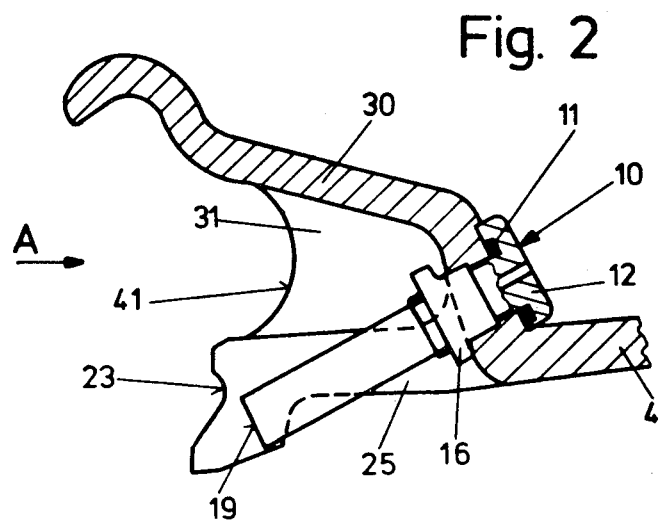
FIG. 2 is an enlarged, partial side elevational view, in section, of a portion of FIG. 1 with a valve mounted in the valve hole.
Figure 3:
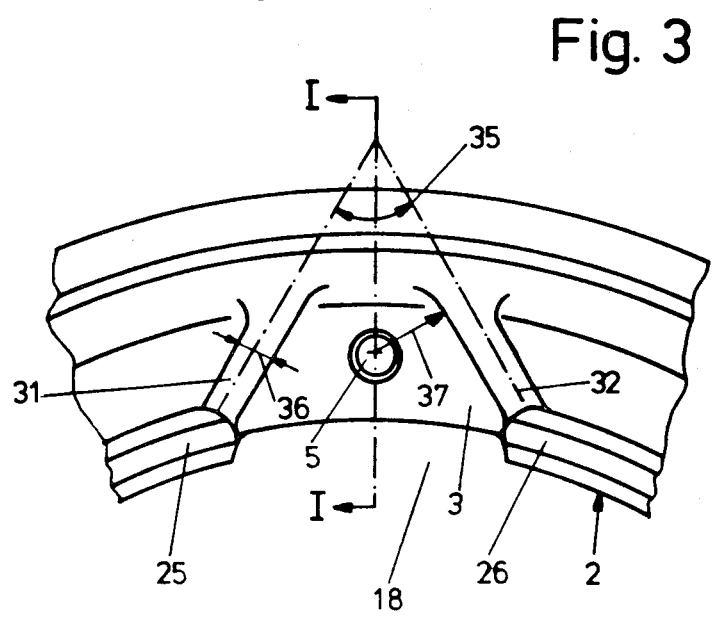
FIG. 3 is a partial front elevational view of the wheel rim of FIG. 1 viewed in the direction of the arrow A in FIG. 2, but without the valve.

The free edge or surface 41 of each rib (FIG. 2) preferably has an inwardly curved or concave shape. However, surface 41 can also be straight or planar as shown by dashed lines 42 in FIG. 1.

While a certain advantageous embodiment has been chosen to illustrate the invention, it will be understood by those skilled in the art that various changes and modifications can be made therein without departing from the scope of the invention as defined in the appended claims.

I claim:

1. A one-piece, cast vehicle wheel rim, particularly for use with tubeless tires, comprising
    a rim portion with a drop center portion defined between opposed first and second side walls and with a shoulder extending from said first side wall in a direction opposite to said drop center portion;
    a support ring extending from said rim portion for mounting the rim on a disc, said support ring having a recess defined between end areas of said support ring;
    a valve hole in said first side wall adjacent said recess for mounting a valve therein such that the valve extends into said recess;
    a rib connected with each of said end areas of said support ring and said shoulder, said ribs extending radially from said end areas and angularly toward each other in a radially outward direction.

2. A rim according to claim 1 wherein said valve hole is located between said ribs and is spaced from each of said ribs by a distance between about 15 mm and about 30 mm.

3. A rim according to claim 2 wherein said ribs define an included angle between about 40° and about 80°.

4. A rim according to claim 1 wherein said ribs define an included angle between about 40° and about 80°.

5. A rim according to claim 1 wherein each of said ribs has a concave free edge extending radially and facing axially.

6. A rim according to claim 1 wherein each of said ribs has a thickness substantially equal to the thickness of said shoulder.

7. A rim according to claim 1 wherein said recess extends in said support ring to said first side wall.

8. A rim according to claim 1 wherein a valve is mounted in said valve hole and extends into said recess such that an air inlet of said valve lies within the space defined by said recess.

* * * * *